United States Patent [19]
Ginsberg

[11] Patent Number: 5,395,088
[45] Date of Patent: Mar. 7, 1995

[54] KEYBOARD STAND

[76] Inventor: Jacob J. Ginsberg, 165 Elgin St., Newton, Mass. 02159

[21] Appl. No.: 684,263

[22] Filed: Sep. 26, 1991

Related U.S. Application Data

[62] Division of Ser. No. 453,692, Dec. 20, 1989, Pat. No. 5,112,020.

[51] Int. Cl.[6] ............................................. A47G 1/24
[52] U.S. Cl. ..................... 248/456; 248/188.5; 248/652; 248/921; 248/922
[58] Field of Search ............ 248/456, 454, 457, 919, 248/920, 921, 922, 923, 652, 653, 371, 188.5, 188.8; 108/1, 9

[56] References Cited

U.S. PATENT DOCUMENTS

| | | | |
|---|---|---|---|
| 2,006,580 | 7/1935 | Brown | 248/454 |
| 2,419,721 | 4/1947 | Kopp | 248/456 |
| 2,588,399 | 3/1952 | McQuin | 248/188.5 X |
| 3,164,351 | 1/1965 | Rembowski | 248/188.5 |
| 3,309,051 | 3/1967 | Pina | 248/188.8 X |
| 3,350,043 | 10/1967 | Apple | 248/188.5 X |
| 4,545,263 | 1/1968 | Southworth | 248/188.5 X |
| 4,555,128 | 11/1985 | White et al. | 248/456 X |
| 4,568,056 | 2/1986 | Lewinski | 248/456 X |
| 4,589,622 | 5/1986 | Hutter | 248/188.5 X |
| 4,632,349 | 12/1986 | Anstey | 248/918 X |
| 4,669,903 | 6/1987 | Herzog et al. | 400/489 |
| 4,693,444 | 9/1987 | Williams et al. | 248/456 X |
| 4,735,394 | 4/1988 | Facco | 248/456 X |
| 4,762,436 | 8/1988 | Herzog et al. | 400/491.3 |
| 4,886,233 | 12/1989 | Bateman et al. | 248/653 X |
| 4,929,488 | 5/1990 | Livi | 248/188.9 |
| 5,112,020 | 5/1992 | Ginsberg | 248/456 |

FOREIGN PATENT DOCUMENTS

| | | | |
|---|---|---|---|
| 1357265 | 5/1963 | France | 248/371 |
| 0061948 | 5/1968 | Germany | 108/1 |

Primary Examiner—Ramon O. Ramirez
Attorney, Agent, or Firm—Robert L. Goldberg

[57] ABSTRACT

The disclosed invention describes a stand used to support a keyboard in an elevated position. The stand may be adjustable so that the angle at which the keyboard is positioned may be changed as desired by the user.

29 Claims, 2 Drawing Sheets

KEYBOARD STAND

This is a divisional of copending application Ser. No. 07/453,692 filed on Dec. 20, 1989, now U.S. Pat. No. 5,112,020.

BACKGROUND OF THE INVENTION

1. Introduction

Computer operators and keypunch operators are constantly sitting in front of terminals for extended periods of time. Without taking frequent breaks, operators usually complain of aches and pains in their arms and upper body. Injuries such as carpal tunnel syndrome and pain in the shoulder, neck, arms and upper body can be traced to constant use of standard computer keyboards. It is an object of this invention to provide a means of supporting the keyboard which alleviates the physical discomfort commonly found with repetitive use of such keyboards.

2. Discussion of prior art

Soft tissue disorders, which include both repetitive motion and back injuries, currently account for 39 percent of all United States workers' compensation claims. The annual accounting of occupational illnesses and injuries, as reviewed in the Nov. 16, 1989 issue of the New York Times (A24), shows that reports of repetitive motion disorders have risen from 18 percent in 1981 to 48 percent in 1988. People whose jobs entail frequent computer use, including writers, computer programmers, data entry operators and administrative personnel are considered at risk for contracting these disorders. Back and neck pain are common complaints associated with typing motions for occasional keyboard users. This type pain can also be associated with the uncomfortable position in which the hands are held even over short periods of time.

The most common repetitive motion disorder is carpal tunnel syndrome. It is a nerve condition of the wrist and fingers, often brought about when computer operators type for hours a day using repetitive wrist and finger motions without proper support. The result is damage to the median nerve, which passes from the arm through the wrist into the hand. The nerve supplies the thumb, index finger, middle finger and part of the ring finger with sensation and muscle control. Repeated wrist movements, such as word processing or data entry without proper support, can cause swelling and compress the median nerve. Symptoms include tingling or numb finger, pain in the thumb, index or middle finger, and aching or weakness in one or both arms. Severe CTS cases are often correctable only by surgery. Once limited mostly to meat packers, poultry workers and pianists, it has become a common complaint among workers who use computers or computerized equipment.

Despite improvements in ergonomic design built into today's personal computer keyboards, users still face risk of musculoskeletal injuries directly associated with keyboard use. These injuries are usually referred to as repetitive strain injuries and include tendonitis, arthritis, carpal tunnel syndrome and muscle spasms. These conditions are the result of a combination of overuse and misalignment of the shoulders, elbows and wrist. Shoulder and neck injuries among keyboard users is usually attributed to the table or chair being positioned too high or too low so that the shoulders are held in a crunch position while working or arms have to be stretched to reach the keyboard, resulting in cumulative trauma to the shoulders.

U.S. Pat. No. 4,762,436 discloses a redesigned keyboard with hand positioning structures to eliminate awkward movements and contortions in the hand position while operating a standard keyboard. The hand positioning structures function by the neuro-sensory process of two point discrimination. With minimal practice, use of the hand positioning structures quickly functions at a subconscious reflex level. The hand positioning structures also provide bio-mechanical balance and symmetry for the fingers and hands; improves keyboard operation; reduces operator neuro-muscular stress and fatigue; and facilitates learning how to operate a keyboard.

U.S. Pat. No. 4,669,903 discloses a redesigned keyboard to reduce stress on nerves and tendons in the wrist and hands. The redesigned keyboard evenly divides the keys to be within easy reach of both hands. Instead of the unbroken array of keys in the standard keyboard, the center of the keyboard has a V-shaped division that moves the keys slightly to the left and right. The division places the hands in a more natural position that reduces strain on hand tendons.

SUMMARY OF THE INVENTION

Both of the above inventions require an increased economic cost along with having to relearn typing skills. The present invention provides a low cost means of reducing physical stress associated with repetitive typing motions. The article of the present invention is portable and may be adjusted to any angle considered to be comfortable for the operator. The adjustable feature allows the user to change the angle of the keyboard to prevent continuously holding the hands in any one position for a prolonged length of time. It also aids in maintaining visual focus on the display screen and visibility of function keys.

More specifically, this invention relates to a means of supporting a computer keyboard in a position which is comfortable for the user and which, relieves physical discomfort associated with constantly sitting in front of a computer screen. It provides a stand for adjusting the angle of the keyboard so that the hands are not always in the same position during continued use and the shoulders are held in a natural relaxed position.

The stand is sturdy so that it absorbs the motion associated with typing. Also provided is a means of preventing the stand from sliding side-to-side during typing. The level of adjustment may be at any angle the user chooses and also provides a means of placing the keyboard in a more direct line of vision for the user.

While the disclosed invention may be used to support a computer keyboard, it is also envisioned that the same stand may be used to support other type keyboards including musical keyboards.

DESCRIPTION OF THE DRAWINGS

The disclosed invention may be illustrated by the following descriptions of the drawings. The drawings are to be taken as mere examples and not as limitations to the practice of the invention.

FIG. 4 shows the keyboard support (31) attached to a rigid member (32) having perforations that align with perforations in the second rigid member (33). The two rigid members are then connected using a fastener (34). For stability, a similar arrangement is located is a similar position on the opposite end of the keyboard support.

FIG. 5 shows an alternate embodiment of FIG. 4 in which both rigid members (41) are pivotally attached to the keyboard support (42) and form an angle (43) with said support. An elastic boot (4) is placed on the bottom of the lower rigid member for frictional stability.

FIG. 6 shows the keyboard support (51) attached to a rod (52) which is inserted into a base (53) containing a threaded perforation (54) through which a thumb screw (55) is inserted and when tightened presses against said rod to hold the rod at the desired position. An elastic boot (56) is placed on the base to provide frictional stability.

FIG. 7 illustrates a means of adjusting by which the keyboard support (61) is connected to a vertical member (62) which is connected to a "u-shaped" member (63) having perforations in the non-curved surfaces (64) which face each other. A base rod (65) is inserted through the perforations, said rod having a frictionally responsive surface which provides a grip for holding the u-shaped member at the desired position. The angle of support is adjusted by compressing the bottom part of the u-shaped member and moving it up or down on the base rod. The base rod has an elastic boot (66) to make it frictionally stable on the surface on which it sits. The base rod also has an enlarged end (67) for retention of the rod in the perforations.

DESCRIPTION OF THE PREFERRED EMBODIMENTS

Figure 1:
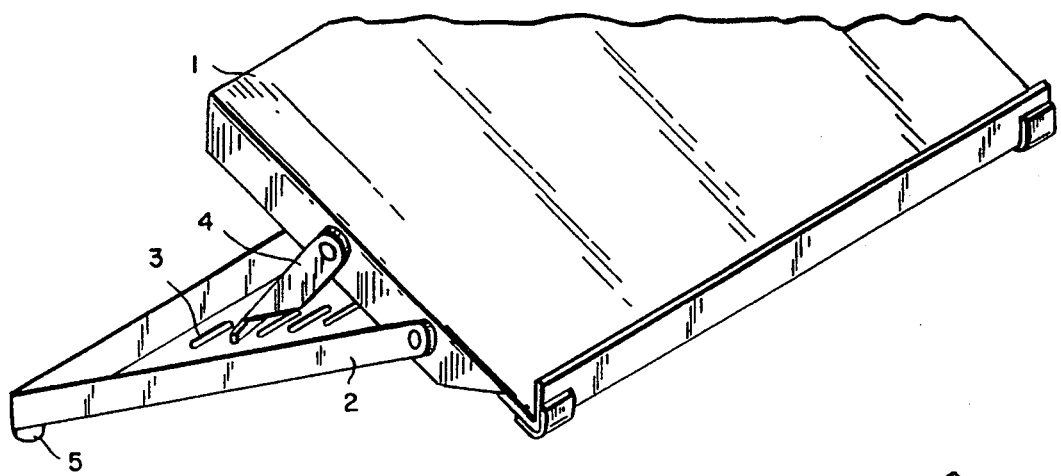
FIG. 1 is an isometric showing of a stand in accordance with the embodiments of the invention. It shows a typical stand constructed from a solid material such as plastic. The stand comprises a keyboard support (1) to which are pivotally attached bases (2) equipped with tracks (3) containing recesses for supporting a rigid member (4) in a fixed position. The rigid member is also pivotally attached to the support. Adjustment are made to the angle of elevation by moving the supporting members forward or backward in the track. The base has attached an elastic foot (5) to provide frictional stability. The keyboard support may be covered with an anti-static material or sprayed to provide a means of dissipating static build-up.
Figure 2:
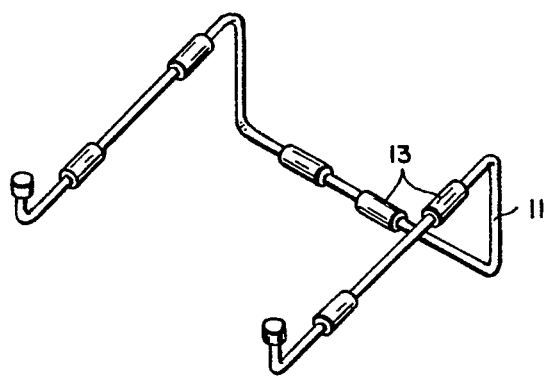
FIG. 2 shows a stand formed from a curved rod (11). This embodiment is not adjustable since the angle at which the keyboard is held is fixed. The keyboard is secured to the stand by means of the hooked portions (12) of the rod. Elastic tubes are used as friction pads (13) to prevent movement of the keyboard on the stand and of the stand on the surface on which it is placed.
Figure 4:
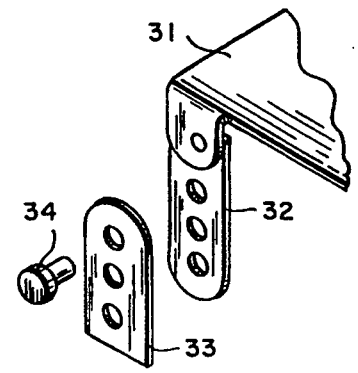
FIGS. 4-7 show other means of elevating or adjusting the height or angle of the keyboard support.
Figure 3:
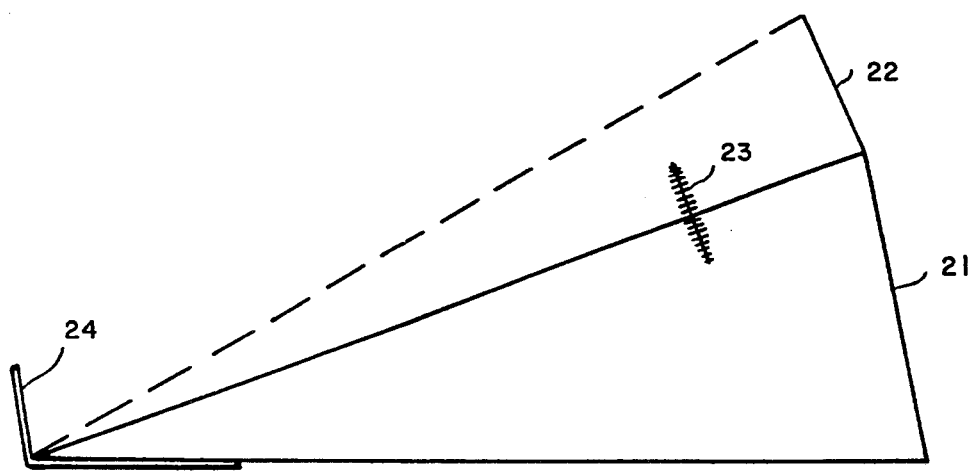
FIG. 3 illustrates a stand made of one (21) or more (22) semi-rigid foam wedges. The angle of support for each wedge is fixed, but the angles may be adjusted by interconnecting two or more wedges of selected angles. The wedges are connected by means of fasteners (23), velcro strips or double-faced tape so that the angles are easily changed. A plastic lip (24) is attached into the bottom wedge to hold the keyboard in place, however, the keyboard could be held in place by means of an indentation formed in the top wedge.
Figure 5:
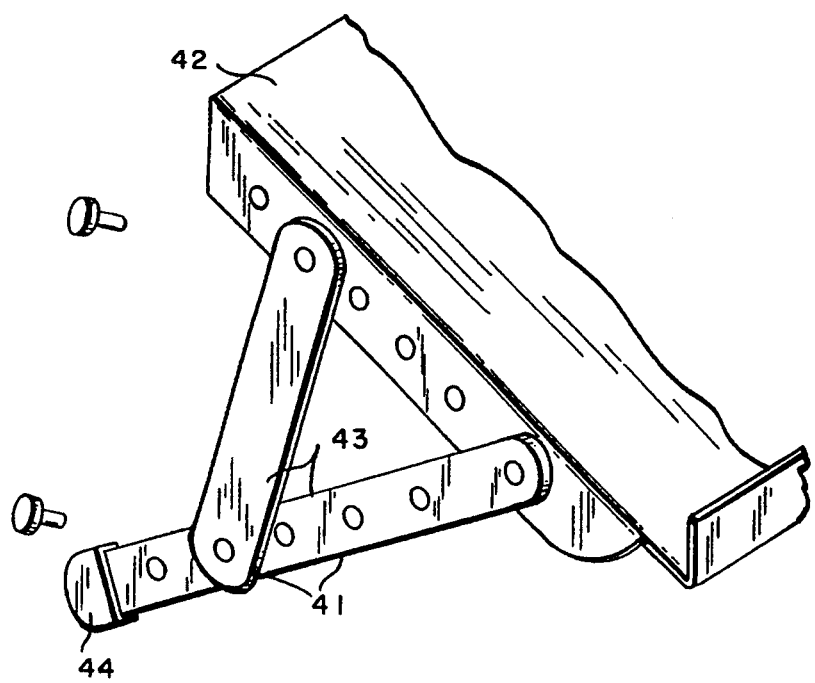
Figure 6:
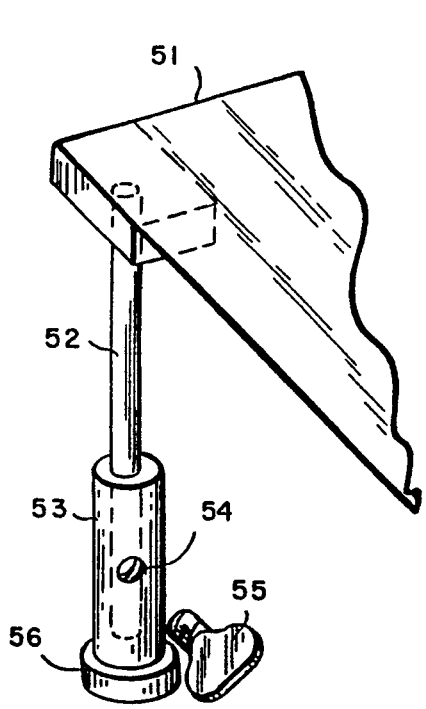
Figure 7:
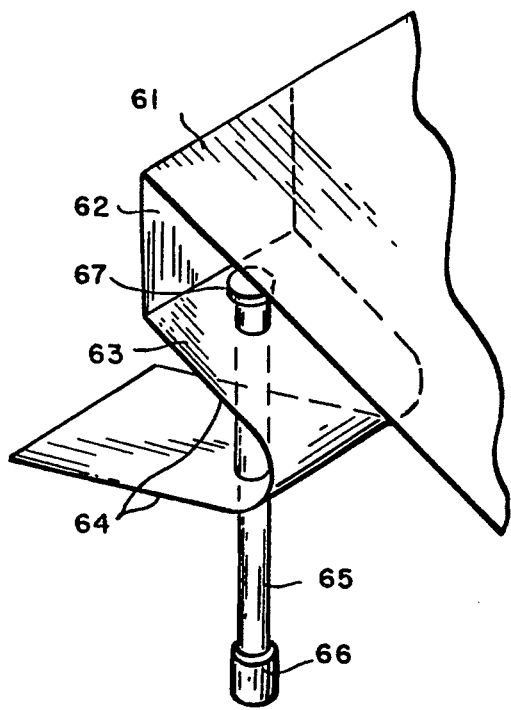

The stand may be constructed out of any material which does not interfere with the electrical operation of the keyboard and the computer. The material may be non-conductive or conductive, if a means for grounding is provided. The preferred materials include plastic, wood, and semi-rigid foam.

The stand may be made anti-static by use of anti-static agents incorporated into the semi-rigid foam or by coating the stand with an anti-static agent when the stand is made from other materials. Examples of suitable anti-static coatings are given in U.S. Pat. No.'s 2,891,878 and 3,914,496, incorporated herein by reference.

The angle between the base of the stand and the supporting member of the stand may be adjusted from zero degrees to ninety degrees, as determined by the user. Preferred angles of choice are between 10 and 50 degrees. The most preferred angles being between 35 and 40 degrees.

The means of adjustment may be accomplished by a variety of techniques. For example, the adjustment may be made by moving the supporting members forward or backward on a track containing recessed grooves to hold the supports in a fixed position. When the stand is constructed in fixed angles, adjustments may be made by interconnecting more than one stand in stacked positions.

The stand is held in a frictionally stable position on the desk or table top on which it is placed by means of non-skid materials which may include semi-rigid foam, urethane or other non-skid materials placed on the bottom of the stand.

The keyboard is held in place on the stand by means of a lip, either continuous or discontinuous, placed along the bottom edge of the support. Other means of securing the keyboard may include curved hooks when the stand is formed from a curved rod.

What is claimed is:

1. In combination, a computer keyboard and a stand for altering the angle of said computer keyboard, said combination comprising:
   (a) said keyboard support;
   (b) said computer keyboard on said support;
   (c) means for elevating one side of said support in an upward manner thereby changing the angle of said computer keyboard and said support;
   (d) means for securing said computer keyboard on said support; and
   (e) means for frictionally stabilizing said combination to prevent said combination from side-to-side movement in use.

2. The combination of claim 1 wherein the means for elevating said support in an upward manner comprises at least one vertical tube having a slideable rod therein and means to secure said rod within said tube.

3. The stand of claim 2 having a static dissipative capability.

4. The combination of claim 3 wherein said stand is coated with a static dissipative material.

5. The stand of claim 2 wherein said stand is made of material chosen from the group consisting essentially of wood, semi-rigid foam and polymeric material.

6. The stand of claim 1 wherein said stand is formed from a curved rod.

7. The stand of claim 6 wherein said curved rod is made of plastic.

8. The stand of claim 6 wherein said means of frictionally stabilizing comprises elastic tubing on portions of said rod.

9. The combination of claim 1 wherein said means for elevating one side of said support is a rigid member forming an angle of less than 90° with said means of elevation.

10. The stand of claim 9 wherein said angle is between 30 and 45 degrees.

11. The stand of claim 1 where said means of elevating is adjustable.

12. The stand of claim 1 wherein said means of elevating comprises at least one wedge attached to said support.

13. The stand of claim 1 wherein said support and means of elevating said keyboard comprise at least one wedge.

14. The stand of claim 1 wherein said stand comprises a plurality of wedges.

15. The combination of claim 1 wherein said means of securing said computer keyboard to said support is a lip.

16. The stand of claim 11 wherein said adjustable elevation comprises at least 2 rigid members having multiple perforations, and being connected with a rigid fastener inserted into said perforations.

17. The stand of claim 16 wherein said fastener is chosen from the group comprising a peg, a screw or a thumb nut.

18. The stand of claim 16 wherein at least one of said rigid members is attached pivotally to said support.

19. The stand of claim 16 wherein said rigid members are parallel.

20. The stand of claim 16 wherein said rigid members form a triangle with said support.

21. The stand of claim 14 wherein said means of elevation further comprises:
    (a) at least one first rigid member attached pivotally to said means of support, and
    (b) at least one second member attached pivotally to said means of support wherein said first member engages said second member at a point opposite said pivot.

22. The stand of claim 11 wherein said means of elevation further comprises:
    (a) at least one first rigid member attached pivotally to said means of support, and
    (b) at least one second member attached pivotally to said means of support wherein said first member engages said second member at a point opposite said pivot.

23. The stand of claim 11 wherein said material comprising said means of elevating is flexible and said means of elevating comprises:
    (a) at least one vertical member connected to said support;
    (b) a "u-shaped" member connected at one end to each said vertical member and having a pair of perforations in the non-curved surfaces facing each other, each non-curved surface being parallel to the other; and
    (c) a rod inserted between said perforations, said rod having a frictionally responsive surface.

24. The stand of claim 23 wherein said rod has enlarged ends for retention of said rod.

25. The stand of claim 11 wherein said means of elevating comprises:
    (a) at least one vertical member;
    (b) a tube having a vertical axis and one threaded horizontal perforation bonded to each said vertical member;
    (c) a rod inserted into said tube; and
    (d) a thumb screw inserted into said threaded perforation which when tightened presses against said rod.

26. The stand of claim 1 wherein said means of securing is at least one hook.

27. The combination of claim 2 where said means to secure said rod within said tube comprises a threaded member passing through a portion of said tube.

28. The combination of claim 1 wherein said means of securing is a discontinuous lip.

29. A method for altering the angle of a computer keyboard, said method comprising the steps of
    supporting said computer keyboard on a keyboard support, said keyboard support having means to elevate one side of said support together with one side of said keyboard in an upward manner and means to secure said keyboard to said support;
    elevating one side of said support bearing said keyboard; and
    securing said keyboard to said support and frictionally stabilizing said keyboard on said support to prevent side-to-side movement during use.

* * * * *